No. 764,943. PATENTED JULY 12, 1904.
E. A. GUY.
SUCKER ROD COUPLING.
APPLICATION FILED APR. 11, 1904.
NO MODEL.

Witnesses
F. E. Alden.
T. Glen Carpenter.

Edward A. Guy, Inventor
By William L. David, Attorney

No. 764,943. Patented July 12, 1904.

UNITED STATES PATENT OFFICE.

EDWARD A. GUY, OF FINDLAY, OHIO.

SUCKER-ROD COUPLING.

SPECIFICATION forming part of Letters Patent No. 764,943, dated July 12, 1904.

Application filed April 11, 1904. Serial No. 202,709. (No model.)

*To all whom it may concern:*

Be it known that I, EDWARD A. GUY, a citizen of the United States of America, residing at Findlay, in the county of Hancock and State of Ohio, have invented certain new and useful Improvements in Sucker-Rod Couplers, of which the following is a specification.

This invention relates to oil-wells, and particularly to a class thereunder known as "rod-couplers."

An object of this invention is to provide novel means for producing a strong joint at the junction of the coupler and the sections of the sucker-rod.

Furthermore, an object of this invention is to provide novel means for causing an expansion of the material forming the interlocking joint in order to insure contact of the surface of the members designed to be joined.

Finally, an object of this invention is to produce a coupling with means for connecting the coupling to the sections of the rod, all of which will possess advantages in points of simplicity and efficiency, proving strong and durable and comparatively inexpensive to produce.

With the foregoing and other objects in view the invention consists in the details of construction and in the arrangement and combination of parts to be hereinafter more fully set forth and specifically claimed.

In describing the invention in detail reference will be had to the accompanying drawings, forming part of this specification, wherein like characters denote corresponding parts throughout both views, in which—

Figure 1:
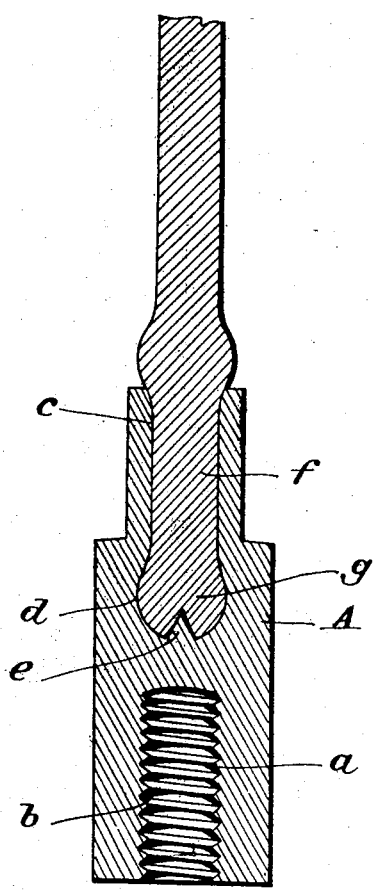
Figure 2:
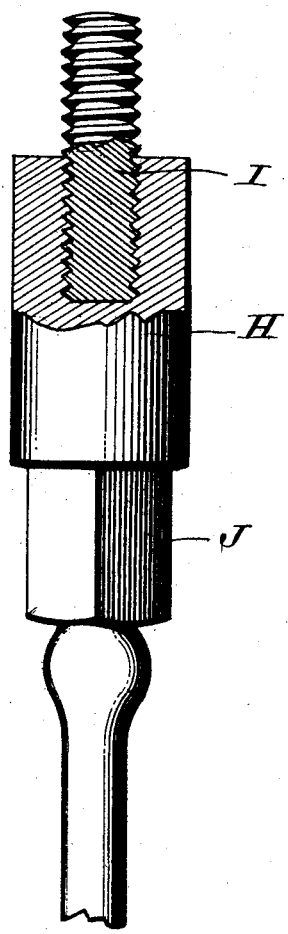

Figure 1 is a view in elevation of a portion of a rod and one member of the coupling being broken away to show the joint between the said rod and coupling. Fig. 2 is a similar view of the opposite member of the coupling and rod.

In the drawings, A denotes one of the coupling-sections having a longitudinally-disposed aperture $a$, the wall of which is threaded, as shown at $b$. The opposite end of this section has a socket or seat $c$, the said socket terminating at its inner end in a chamber $d$, which is approximately round. The wall of the chamber is provided with a conical lug $e$, which acts as a spreader when the section of the sucker-rod $f$ is driven therein, it being the purpose of the lug to cause the end of the rod to expand within the chamber, that it may engage the wall of the said chamber and produce an enlargement on the end of said rod in order to prevent the withdrawal of the said rod from the section of the coupling. The rod $f$ is expanded at the point $g$ at the outer end of the coupling by a continuation of the driving of the rod after the lower end has expanded to the position shown in the drawings. The opposite member H has a threaded aperture in its end, to which a threaded stud I is applied, the said stud I being threaded its entire length and being utilized for the purpose of engaging the coupling member A in the usual manner.

As the joint betweeen the coupler member H and its rod is similar in all respects to that heretofore described, it will not be referred to in detail.

The ends of the sections of the coupling are polygonal, as shown at J, to receive wrenches when the parts are to be screwed together, and it is my purpose to form the two sections of malleable iron, thereby enabling me to produce the end sockets and the lug by suitable cores; but I do not desire to be limited in this respect, as it may be found desirable to accomplish the result by other means.

The construction, operation, and advantages will, it is thought, be understood from the foregoing description, it being noted that various changes may be resorted to in the proportions and details of construction for successfully carrying the invention into practice without departing from the scope thereof.

Having fully described the invention, what I claim as new, and desire to secure by Letters Patent, is—

1. On an oil-well pumping-rod, a coupler comprising two engaging sections, the said sections having sockets in their opposite ends, the said sockets terminating in chambers and in combination therewith rod-sections having their ends inserted in the sockets and enlarged to fill the chambers, and means within the chambers for spreading the rods.

2. In a device of the character described, two interlocking sections, each having a socket and a chamber in its outer end, a lug projecting from the wall of each chamber, and rods inserted in the sockets having their ends impinged on the lugs whereby the ends of the rods are spread to fill the chamber substantially as described.

3. In a device of the character described, two sections, a threaded stud in one section and adapted to thread into the opposite section, the outer ends of each section having a socket and chamber, and rod-sections having their ends seated in the sockets and chambers, and means within the chamber for spreading the rod to contact with the wall of the chamber, substantially as described.

In testimony whereof I affix my signature, in the presence of two witnesses, this 9th day of April, 1904.

EDWARD A. GUY.

Witnesses:
CHAS. M. BURLINGAME,
HARRY R. B. CARPENTER.